(No Model.)
H. A. HUGHES.
PROCESS OF SUGAR PRODUCTION FROM SORGHUM.
No. 402,082. Patented Apr. 23, 1889.
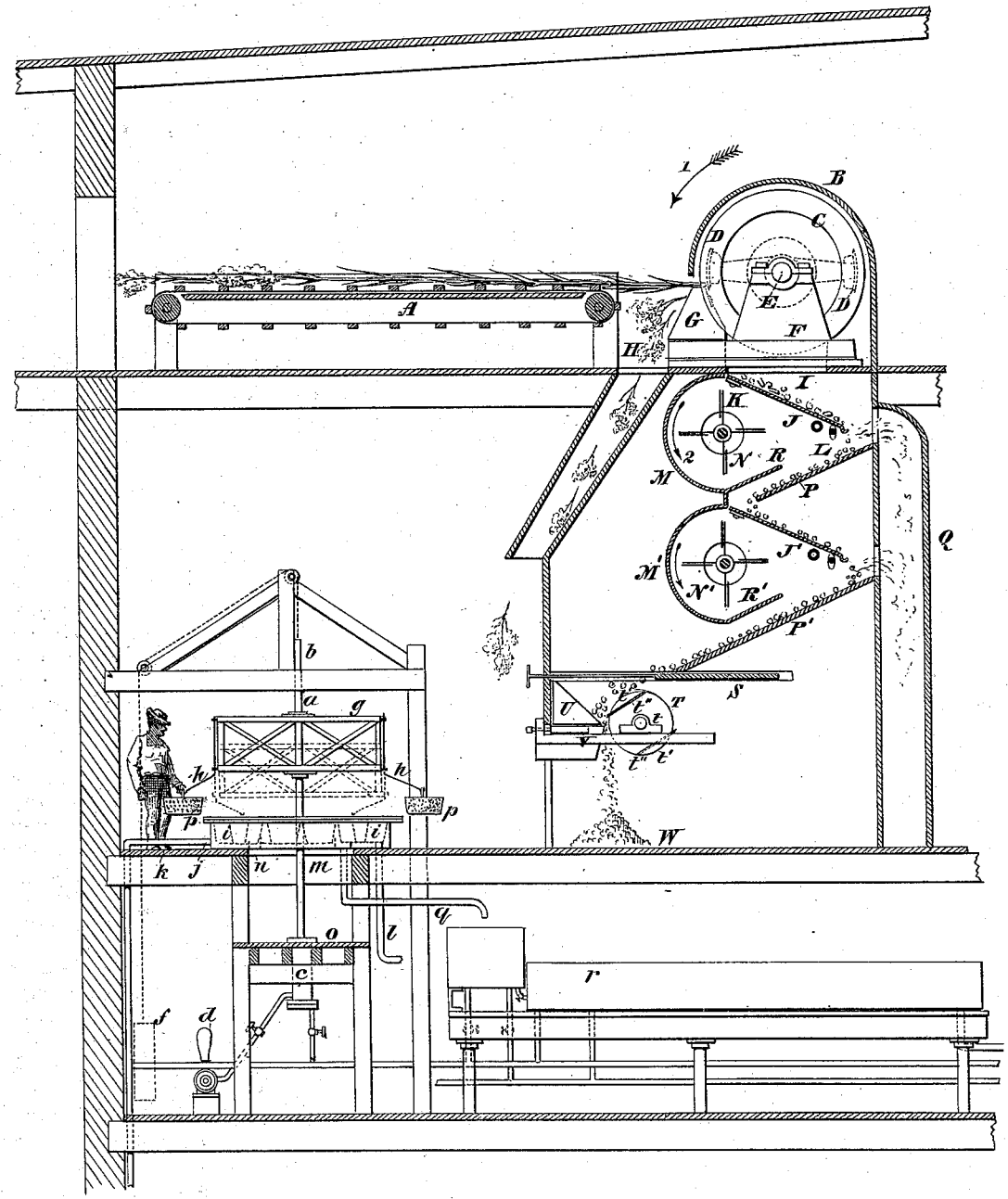

UNITED STATES PATENT OFFICE.

HENRY A. HUGHES, OF RIO GRANDE, NEW JERSEY.

PROCESS OF SUGAR PRODUCTION FROM SORGHUM.

SPECIFICATION forming part of Letters Patent No. 402,082, dated April 23, 1889.

Application filed December 27, 1887. Serial No. 258,964. (No specimens.)

*To all whom it may concern:*

Be it known that I, HENRY A. HUGHES, of Rio Grande, Cape May county, New Jersey, have invented a new and useful Improvement in Processes of Sugar Production from Sorghum, of which the following is a specification.

My invention relates to the production from sorghum of a sugar-liquor in evaporated form ready for transmission to the vacuum-pan or to any other apparatus for obtaining the sugar in crystalline state.

In the accompanying drawing is represented a vertical section through a sugar-house provided with suitable machinery for carrying my process into practical effect.

The sorghum-stalks are first placed, butts foremost, upon the traveling apron A, the upper surface of which moves toward a cutting apparatus, B. The said cutting apparatus consists of two disks, one of which appears at C, between which disks are arranged knives D. (Shown in dotted lines.) The disks C are mounted on a shaft, E, which is rotated in the direction of the arrows in bearings in supports F. In front of the disks is a block or support, G. The cane fed forward by the traveling apron A moves over the support G, and so comes beneath the rapidly-revolving knives D. The speed of rotation of the disks C or the speed of travel of the apron A should preferably be so regulated that the cane may be cut in accordance with the process patented to me in Letters Patent No. 354,905, dated December 28, 1886, whereby the stalks are divided and the leaves and sheaths simultaneously cut loose. The edge of the apron A is placed at a distance from the support G, so that the seed-heads of the stalks, becoming unsupported by the apron, fall into the chute H in front of the apron, and so are prevented from passing under the knives D.

In another application for Letters Patent filed simultaneously herewith, Serial No. 258,965, I have fully described and claimed the construction of the rotary cutting apparatus above referred to, and in still another application for Letters Patent simultaneously filed herewith, Serial No. 258,962, I have fully described and claimed the means for removing the seed-heads from sorghum-cane above set forth; hence the subject-matter of both of the aforesaid applications is herein disclaimed.

The cane, having been divided by the rotary knives D, passes down through an opening, I, in the floor beneath the cutting apparatus to an inclined screen, J. This screen is pivoted at K, and is vibrated at its lower end by means of a cam, L, on a transverse rotary shaft. Beneath the screen J and inclosed in a suitable casing, M, is a fan-blower, N, rotated in the direction of the arrow 2 by any suitable means. The blast of this fan is delivered directly below the vibrating lower edge of screen J, so that it passes through the pieces of cane and leaves while the latter are falling from the screen J to the inclined slide P. The blast operates to separate the lighter leaves and sheaths from the heavier masses of cane and to blow the former into the trunk or passage Q. Beneath the blower N is an inclined partition, R, which prevents the cane entering the blower-chamber. After the cane has descended the inclined slide P, it passes upon a vibrating screen, J', similar in all respects to screen J, and is submitted to the blast from the fan-blower N', similarly arranged to fan-blower N, whereby any remaining loose leaves or sheaths are driven into the trunk Q. Fan-blower N' has a casing, M', similar to casing M, and a protecting-partition, R', similar to partition R, and the cane after being subjected to the second blast falls upon an inclined slide, P'.

In another application for Letters Patent simultaneously filed herewith, Serial No. 258,963, I have fully described and claimed the construction and arrangement of the fan-blower N, vibrating screen J, and other parts of the above-set-forth apparatus for removing the leaves and sheaths from the cut cane. The subject-matter of said application is therefore herein disclaimed.

After passing down the slide P', the cane meets a sliding gate, S, by which its delivery is regulated to the rotary shredding-cylinder T. From the gate S the cane falls upon the inclined slide U. The cylinder T consists of a solid body, *t*, with two flat sides, to which are applied segmental pieces *t'*. The knives *t''* are clamped between said segmental pieces and cylinder-body, and their edges protrude slightly from the cylinder-periphery. The knives are set substantially without clearance, so that their effect upon the cane, which after passing down the slide U finally rests upon the block or support V, is to shred or to disintegrate the fibers. Inasmuch as the upper edge of the support V is set very close to the path of rotation of the knife-edges, it will be obvious that this shredding action occurs between the knife-edges and the edge of said support, between which the disintegrated material passes, and falling to the floor W is there collected.

In another application for Letters Patent filed simultaneously herewith, Serial No. 258,968, I have fully described and claimed the construction and arrangement of the cane-shredding device above set forth. The subject-matter of said application is therefore herein disclaimed.

The shredded cane is next submitted to diffusion in hot water. I do not limit myself to any particular mode or process of diffusion herein, but prefer to employ the process which I have fully described and claimed in another application for Letters Patent, Serial No. 258,966, filed simultaneously herewith, and also an apparatus for carrying said process into practical effect, which is described and claimed in still another application for Letters Patent filed simultaneously herewith, Serial No. 258,967. The subject-matter of said applications is herein disclaimed.

The diffusion apparatus indicated in the accompanying drawing and fully described and claimed in my application aforesaid is briefly as follows:

$a$ is a shaft capable of free vertical motion as well as free rotary motion in its bearing $b$ and in the hydraulic cylinder $c$, of which cylinder said shaft forms the plunger. When water is forced into cylinder $c$ by the pump $d$, the shaft is elevated, its movements being assisted by a counter-weight, $f$, connected to it. When water is allowed to escape from cylinder $c$, the shaft descends. Upon the shaft $a$ is a circular frame-work, $g$, upon the periphery of which are several pivoted brackets, the arms $h$ of which may be swung outward or inward, as desired. Beneath the frame-work $g$ is a battery of diffusion-cells, $i$, each cell being independent of the others, and all disposed around an annular jacket, $j$, to which steam or hot water is admitted by the pipe K and allowed to escape by pipe $l$.

The annular jacket $j$ surrounds an opening, $m$, in the floor, and immediately around the upper edge of this opening is a trough, $n$, with which connects a short pipe from each cell $i$, so that by opening stop-cocks in said pipes at will any or all the cells may be caused to discharge their contents into the trough $n$. A platform, $o$, is provided, on which the operator who manipulates the stop-cocks stands, and which also supports the cylinder $c$.

The disintegrated cane is collected in perforated metal baskets $p$, which are hung upon the arms $h$ of the swinging brackets. The shaft $a$ being elevated, the baskets are lifted and the arms $h$ are swung inward, so as to bring the baskets over the cells, which are previously filled with hot water. The shaft $a$ is then lowered, as indicated by the dotted lines, when the baskets are immersed in the cells, the water in which dissolves out the sugar from the cane. After the baskets have been in the cells for a certain time the shaft is elevated to lift them out, and then rotated and again lowered, so that the basket which was formerly in cell No. 1 is now in cell No. 2, and so on. In this way each basket is immersed once in each cell, and each cell receives in turn all the baskets. The result is that the water in the cells becomes more and more charged with sugar until a desired density is reached, when the liquor is drawn off into the trough $n$, and thence conducted by the pipe $q$ to the evaporator $r$.

The construction of the evaporator represented is not shown here, because it forms no part of my present invention, which is not limited to any particular form of evaporating device. Its office and function are to expel the water from the sugar-liquor by evaporation until such liquor shall reach a concentrated condition suitable for further treatment to produce crystallization.

I claim—

1. The process of preparing sorghum-cane for diffusion, which consists in first dividing the cane into short lengths and freeing it from seed-heads, leaves, and sheaths; second, separating the leaves, sheaths, &c., from the cane; third, subjecting the cane to shredding or fibrous disintegration, substantially as described.

2. The process of producing sugar-liquor from sorghum, which consists in first dividing the cane into short lengths and freeing it from seed-heads, leaves, and sheaths; second, separating the leaves, sheaths, &c., from the cane; third, subjecting the cane to shredding or fibrous disintegration; fourth, subjecting the disintegrated cane to diffusion in hot water until the water dissolves from said cane a given percentage or quantity of sugar, substantially as described.

3. The process of producing concentrated sugar-liquor from sorghum, which consists in first dividing the cane into short lengths and freeing it from seed-heads, leaves, and sheaths; second, separating the leaves, sheaths, &c., from the cane; third, subjecting the cane to shredding or fibrous disintegration; fourth, subjecting the disintegrated cane to diffusion in hot water until the water dissolves from the cane a given percentage or quantity of sugar, and, fifth, subjecting the liquor so obtained directly to evaporation until a concentrated liquor suitable for treatment in the vacuum-pan is produced, substantially as described.

HENRY A. HUGHES.

Witnesses:
D. H. DRISCOLL,
EDGAR GOODWIN.